United States Patent [19]

Mori et al.

[11] Patent Number: 5,074,197
[45] Date of Patent: Dec. 24, 1991

[54] MASTER CYLINDER WITH MICRO-SIZED GROOVES IN PISTON GUIDE

[75] Inventors: Kohei Mori; Kimio Ishihara, both of Higashimatsuyama, Japan

[73] Assignee: Jidosha Kiki Co., Ltd., Tokyo, Japan

[21] Appl. No.: 477,443

[22] Filed: Feb. 9, 1990

[30] Foreign Application Priority Data

Feb. 23, 1989 [JP] Japan .................. 1-20542[U]
Mar. 24, 1989 [JP] Japan .................. 1-34077[U]

[51] Int. Cl.[5] .................. F16J 15/18; B60T 11/20
[52] U.S. Cl. .................. 92/165 R; 92/171.001; 60/562; 60/588; 60/592
[58] Field of Search .................. 92/165, 169.1, 82, 142, 92/163, 171.1; 60/562, 584, 585, 588, 592, 533

[56] References Cited

U.S. PATENT DOCUMENTS

| | | | |
|---|---|---|---|
| 4,249,381 | 2/1981 | Gaiser | 92/171.1 X |
| 4,474,005 | 10/1984 | Steer | 60/562 |
| 4,510,752 | 4/1985 | Gaiser | 92/171.1 X |
| 4,527,395 | 7/1985 | Gaiser et al. | 60/562 |
| 4,718,234 | 1/1988 | Steer | 60/562 |
| 4,790,138 | 12/1988 | Steer | 60/578 |

FOREIGN PATENT DOCUMENTS 2017240 10/1979 United Kingdom .................. 60/562

Primary Examiner—Edward K. Look
Assistant Examiner—John Ryznic

[57] ABSTRACT

In a master cylinder for use in various braking devices of an automatic vehicle and the like, a cylinder housing is constituted by a body having an opening at one end thereof and by a cap which is coupled with the body to close the opening. A piston is inserted through the cap and is freely slidably arranged inside the cylinder housing and is guided by a piston guide or a sleeve having a path which is in communication with an external fluid path. The master cylinder has a single groove or a plurality of grooves with a micro-sized depth defined in the surface of the piston guide where it engages the cylinder housing between the external fluid path and a pressure chamber defined by the master cylinder and piston. The master cylinder also has a tapered portion provided on the inner surface of the cylinder housing, and another tapered portion is provided on the end of the sleeve. The sleeve is assembled to the cylinder housing by bringing the tapered portion into abutment with the tapered portion on the cylinder housing.

4 Claims, 4 Drawing Sheets

MASTER CYLINDER WITH MICRO-SIZED GROOVES IN PISTON GUIDE

FIELD OF THE INVENTION AND RELATED STATEMENT

The present invention relates to an improvement in the construction of the master cylinder for use in various braking devices of an automatic vehicle and the like.

A tandem, type master cylinder as shown in FIG. 7 represents one example of a traditional master cylinder. The master cylinder 1 is constituted by a body 3 having an opening defined through one end thereof as a cylinder housing and by a cap 4. The body 3 has an opening 3a defined through one end thereof with a male thread 4b formed in the outer peripheral surface of one end of the cap 4. The cap 4 is secured to the body 3 by engaging the male thread 4b with a corresponding female thread 3b of the body 3.

The tip end of the primary piston 5 and a secondary piston 6 are inserted through the cap 4 and are freely slidably arranged via piston guides 7 and 8 inside the above-described body 3. In the body 3, a first pressure chamber 10 is formed by the primary piston 5 and a resin sleeve 9, whereas a second pressure chamber 11 is formed by the secondary piston 6 and the inner wall surface of the body 3. The first and second pressure chambers 10 and 11 are provided with spring mechanisms 12 and 13 respectively. Meanwhile, annular sealing members 14, 15, 16 and 17 are also provided within the cylinder housing.

Thus, when the primary and secondary pistons 5 and 6 are pushed into the first and second pressure chambers 10 and 11 respectively in the leftward direction of FIG. 7, a liquid pressure in these pressure chambers 10 and 11 is elevated to cause a working liquid to be pumped out of delivery ports 18 and 19 into a braking system (not shown).

In the master cylinder 1, primary and secondary pistons 5 and 6 are inserted and guided by means of the piston guides 7 and 8 respectively which comprise a sleeve 9 positioned in place inside the cylinder housing 2 and passages 24 and 25 leading to replenish liquid passages 21, 22 and 23 which in turn extend from an oil reservoir 20.

In the first pressure chamber 10 of the primary piston 5 side, a pressure release groove 26 is defined in the side surface of the sleeve 9 which is positioned at the side of the piston guide 7, and the groove is utilized to release the brake liquid upon the vehicle being unbraked. The pressure release groove 26 opens at its one end to the sealing member 15 side and has its opposite end in communication with the replenish liquid passage 22, thus creating an opening area with a tapered configuration such that the area is reduced at the inside of the sleeve 9 and increased at the outside of the sleeve 9. A liquid pressure in the first pressure chamber 10 is elevated to urge the sealing member 15 against the end of the sleeve 9 and the left side wall of the piston guide 7 to form a sealing effect therebetween. In this case, according to the tapered configuration, the sealing member 15 is so designed that its corner may not dig into the pressure releasing groove 26. Meanwhile, a small diameter hole is bored through the side surface of the primary piston 5 and the hole provides a replenish liquid passage which extends from the oil reservoir 20 to the first pressure chamber 10 upon the brake released.

In the second pressure chamber 11 at the other second piston 6 side, however, there is only provided slight clearances each in a sliding surface between the piston guide 8 and the piston 6 side and in an enaging surface between the piston guide 8 and the body 3 side. Consequently, when a driver removes his or her foot away from the brake pedal abruptly while the brake is effecuated, the secondary piston 6 which has been moved on the leftward stroke is forced to move on a rightward stroke suddenly by means of spring mechanism 13. At this instant, a negative pressure is induced inside the pressure chamber 11 to prevent the rightward movement of the secondary piston 6. At the same time, the working liquid inside the oil reservoir 20 is caused to flow into the pressure chamber 11 through the passage 25 and the small diameter hole 28 bored in the side surface of the secondary piston 6, but if the passage 25 is closed the working liquid in turn begins flowing into the pressure chamber 11 through the slight clearances defined in the inner and outer surfaces of the piston guide 8. As a result, a problem of no "double pedaling effect" occurs, that is, a negative pressure prevails in the pressure chamber for prolonged periods and thereby delay the backward movement of the secondary piston 6.

Especially when the piston guide B is made from a resin-based material, a clearance to be formed between the piston guide 8 and the body 3 is subject to a varied constriction depending on several parameters such as a temperature, a humidity and the like and in some cases it can be substantially non-existant. This brings forth a further problem that the double pedaling effect is not obtained.

On the other hand, the sleeve 9 made from a resin is formed so that its outer diameter is smaller than the inner diameters of the body 3 and those of the cap 4 to allow for a thermal expansion and a less stringent manufacturing tolerances etc.

Thus, the sleeve 9 is arranged around the inner peripheral surfaces of the body 3 and the cap 4 with a clearance formed relative to these surfaces. As a result, when the pressure inside the pressure chamber 10 is elevated, the sleeve 9 is deformed radially outwardly under such an elevated pressure so that the volume of the pressure chamber 10 is substantially enlarged.

Accordingly, such master cylinder produces a problem that a loss may occur during the pressure increasing cycle and an efficient transfer of hydraulic pressure from the master cylinder to the wheel cylinder is blocked.

OBJECT AND SUMMARY OF THE INVENTION

The present invention has been made with the above-described problems taken into account, and its one object is to provide a master cylinder in which double pedaling effect is expected to take place.

Another object of the present invention is to provide a master cylinder which is adapted to suppress the expansion of the sleeve to thereby alleviate a loss in the pressure increasing cycle.

To achieve the above-described objects, the present invention is constituted such that it may provide a master cylinder comprising a cylinder housing including a body having an opening at one end and a cap which is coupled with the body to close the opening, a piston engageably inserted through the cap and freely slidably arranged in the cylinder housing and a piston guide or a sleeve having a passage which is in communication with an external fluid passage, the master cylinder being guided by means of piston guide or the sleeve, wherein the master cylinder is characterized by the aspects as described in (1) and (2) hereinbelow.

(1) A single or a plurality of groove(s) having a micro-sized depth is defined through a surface of the piston guide where it engages the cylinder housing between the external fluid passage and the pressure chamber constituted by the cylinder housing and the piston.

In accordance with the present invention, even if a clearance to be formed between the piston guide and the cylinder housing is excessively small, or such clearance is reduced substantially to be non-existant owing to a difference in constriction characteristics between these two members under the influence of temperature and humidity etc., it is nevertheless possible for the working liquid to flow from the oil reservoir through the groove because the piston guide is provided with such groove(s). In this manner, the flow of the working liquid from the oil reservoir is ensured even if a clearance between the piston guide and the cylinder housing is rendered non-existant, and therefore double pedaling effect may be expected unlike as often experienced with a traditional type master cylinder.

(2) Another featuring aspect of the invention lies in the arrangement of a tapered portion on the inner surface of the cylinder housing, and another tapered portion is provided on the end of the sleeve such that the sleeve may be assembled to the cylinder housing by bringing these tapered portions into abutment with each other.

In the master cylinder of the present invention, the sleeve is arranged in position such that the tapered portion on the inner surface of the cylinder housing is in abutment with the tapered portion of the sleeve. Consequently, the sleeve of the master cylinder is less liable to be expanded in a radial direction in response to an elevation in its internal pressure, and thereby a loss during the pressure increasing cycle is alleviated compared to a traditional means and a more efficient transfer of hydraulic pressure to the wheel cylinder in the braking system is allowed. Furthermore, another effect is derived that the sleeve can be centered more exactly relative to the cylinder housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 through 4 are views showing one embodiment of the master cylinder in accordance with the present invention, wherein;

FIG. 1 is a cross-sectional view of the master cylinder;

FIG. 2 is an enlarged view along the portion A in FIG. 1;

FIG. 3 is a perspective view of the piston guide;

FIG. 4 is a pressure variation chart as observed in the second pressure chamber against time from when the brake pedal is released;

FIG. 5 and FIG. 6 are views showing the second embodiment of the master cylinder in accordance with the present invention; wherein FIG. 5 is a longitudinal cross-sectional view of the master cylinder and FIG. 6 is a view showing in enlargement the portion where the sleeve is attached to the cylinder housing.

DETAILED DESCRIPTION OF PREFERRED EMBODIMENT

A preferred embodiment of the present invention will be described hereinbelow, with reference to the accompanying drawings.

FIRST EMDODIMENT

Figure 1:
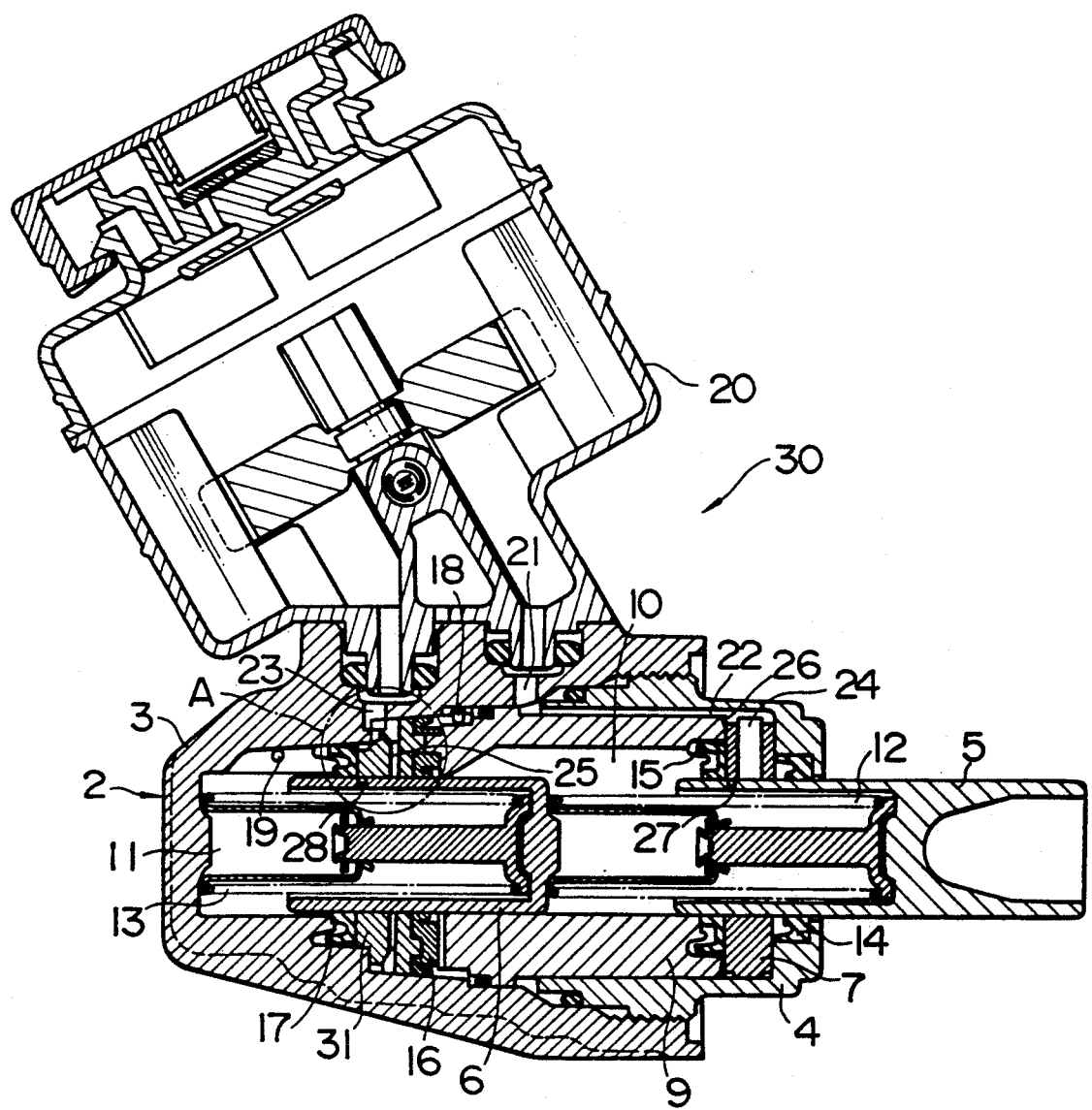
Figure 2:
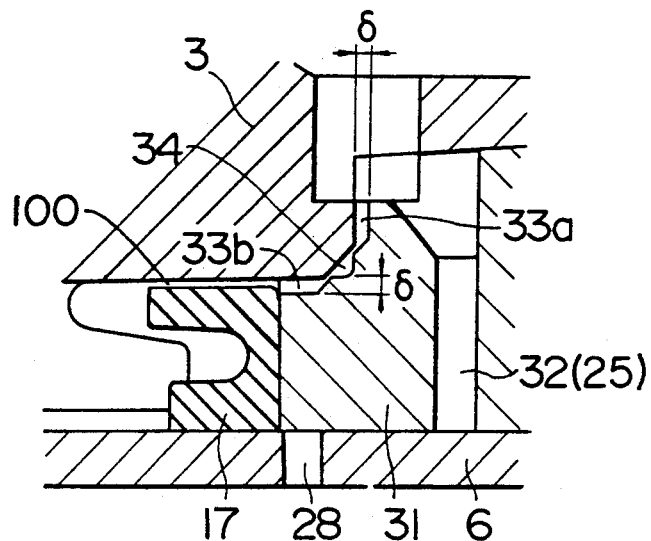
Figure 3:
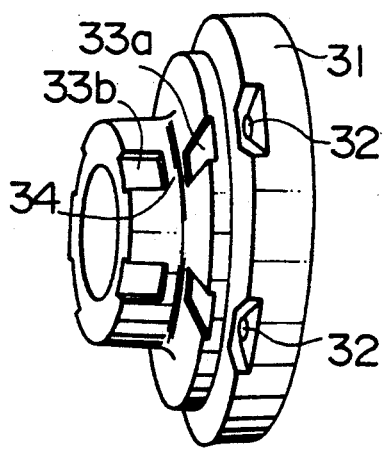
Figure 7:
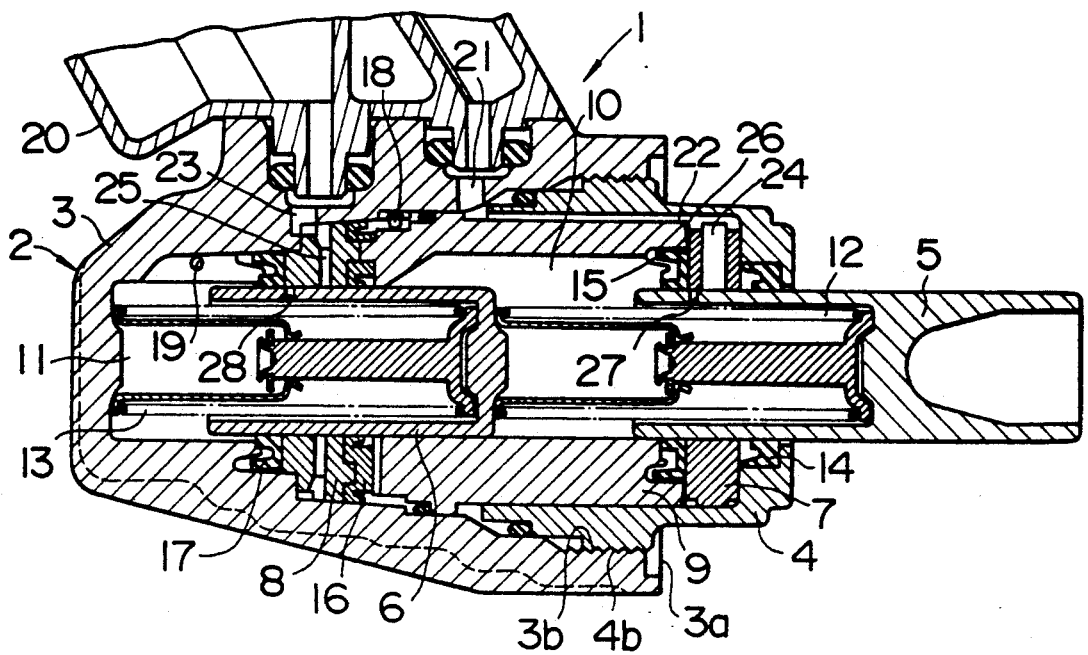
FIG. 7 is a cross-sectional view of the traditional master cyliner.

FIG. 1 through 3 show one embodiment of the master cylinder of the present invention, and the same numerals are used to indicate components which are identical to those of FIG. 7 and their detailed description is omitted herein.

In FIG. 1 through 3, a plurality (four in number in this embodiment) of through holes 32 is defined through the piston guide 31 of the master cylinder 30 to extend radially from its outer peripheral surface to its inner peripheral surface. A plurality of grooves 33a and 33b each having a micro-sized depth δ along a radial direction is also provided in a surface of the piston guide 31 where it engages the body 3. In this case, such grooves are not provided if some clearance is formed in a region of the surface where it engages the body 3, i.e., on a right angled portion 34 shown in FIG. 2 and FIG. 3, but the groove 33a and 33b are defined in the portion where such engagement is established with a slight clearance formed. The groove 33a and 33b may be defined in the area where the piston guide 31 engages the body 3 to run continuously in a radial direction.

In the master cylinder 30, when a pressure is exerted on the primary piston 5 as the brake pedal (not shown) is pressed down to apply braking, the primary piston 5 and the secondary piston 6 are urged to move in a leftward direction shown in FIG. 1, and the working liquid passages 24 and 25 are blocked by means of sealing members 15 and 17 in communication with small holes 27 and 28 and thereby elevating the liquid pressure inside the first and second pressure chambers 10 and 11. In this case, the sealing member 17 is urged against the end of the piston guide where it engages the body 3 and against the left side wall to form a sealing effect. Since the groove 33b is micro-sized in depth, the corner portion of the sealing member 17 is prevented from digging into the groove 33b.

Then, if the brake pedal is released abruptly during the application of braking force, the secondary piston 6 which has been on a leftward stroke is caused to shift to a rightward stroke by means of spring mechanism 13. Although a negative pressure is momentarily produced in the second pressure chamber at this instant, it is nevertheless possible for the working liquid to flow from the oil reservoir 20 passing through a plurality of grooves 33a and 33b defined through the piston guide 31 and through the clearance 100 defined in the surface of the sealing member 17, and thereby permitting the secondary piston to shift to the rightward stroke smoothly.

Figure 4:
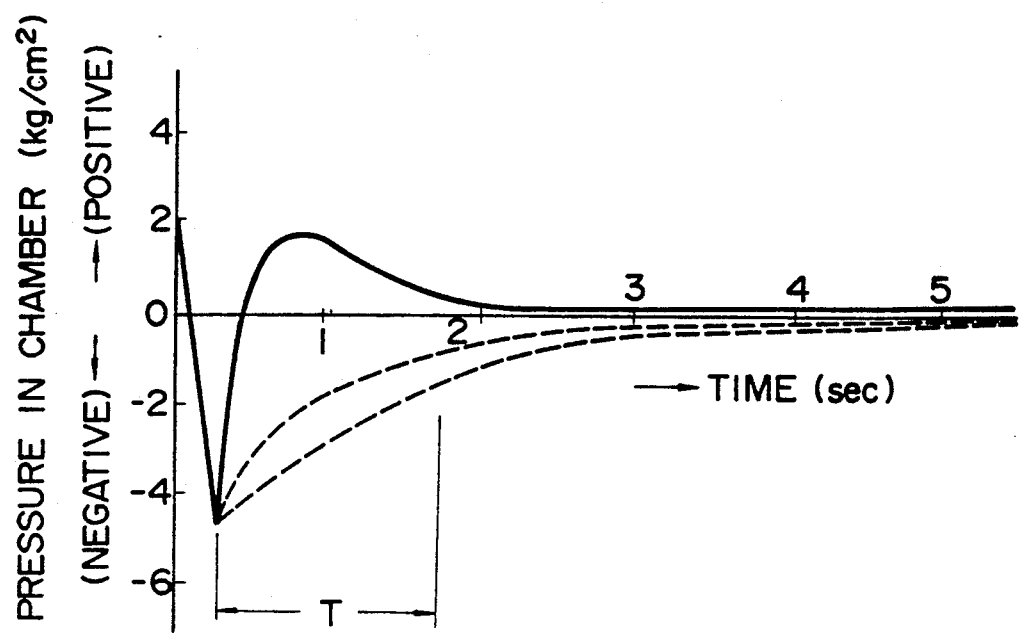

FIG. 4 shows by way of example a pressure variation against time as observed at this moment in the second pressure chamber with a solid line. As shown in this characteristics curve, when the brake pedal is released abruptly, it is a negative pressure that is prevalent in the pressure chamber but such negative pressure is changed to a positive pressure immediately after the working liquid begins flowing from the oil reservoir 20, and its pressure returns back to a level achievable by the return of the liquid from the brake wheel in the braking system, and then falls gradually. In the meantime, a dotted line shows a pressure variation with time for the traditional type master cylinder providing unstable characteristics. In the same Figure, a time T needed to respond to the release of the braking can be suitably shortened depending on the depth $\delta$, the width and the number of the grooves, and thus the double pedaling effect may be expected.

By defining the grooves 33a and 33b in the piston guide 31, it is thus possible to ensure a flow passage for the working fluid from the oil reservoir even if the clearance of the engaging surface between the piston guide 31 and the body 3 is rendered non-existant due to a temperature, a humidity and the like.

SECOND EMBODIMENT

Figure 5:
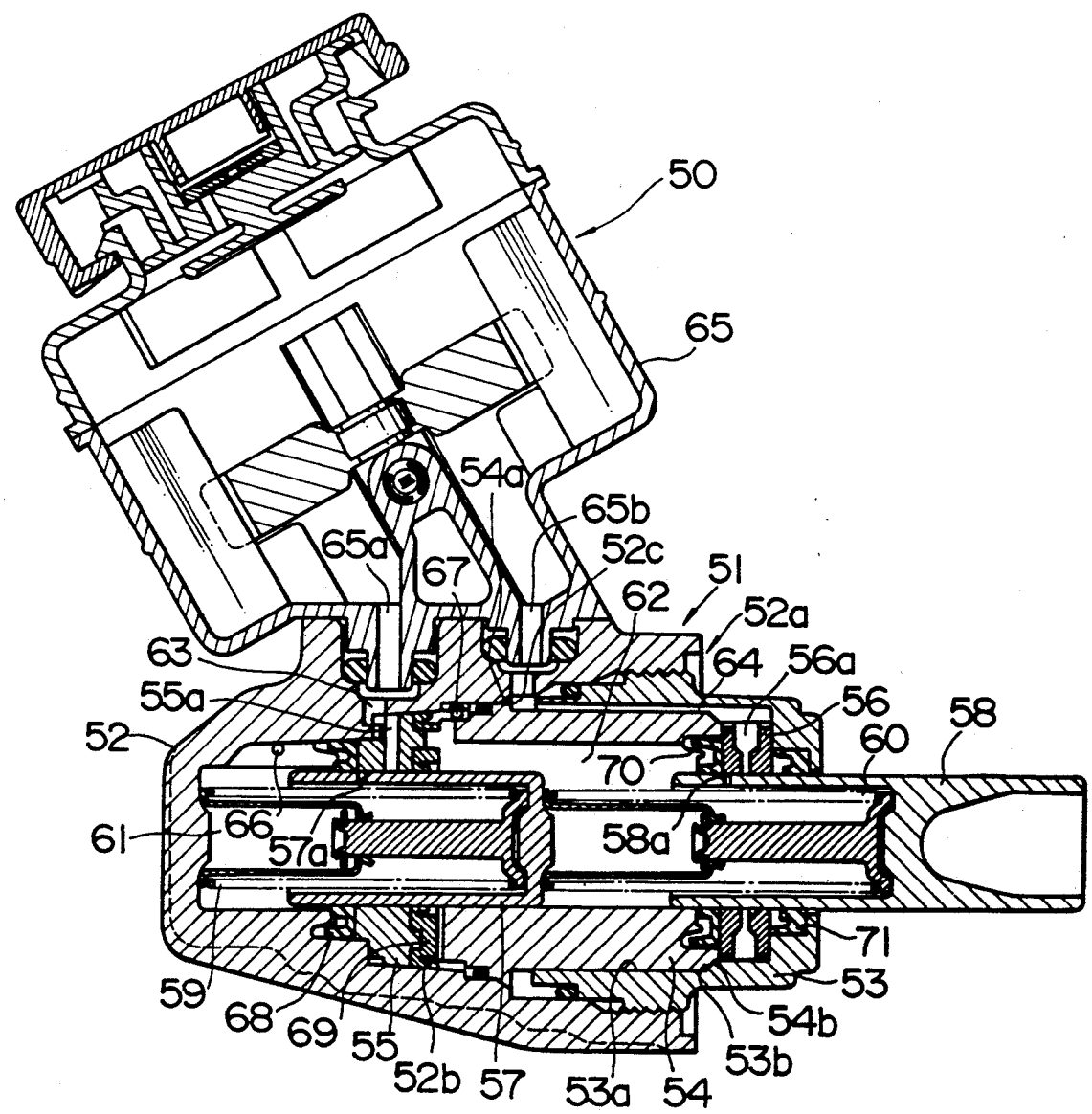
Figure 6:
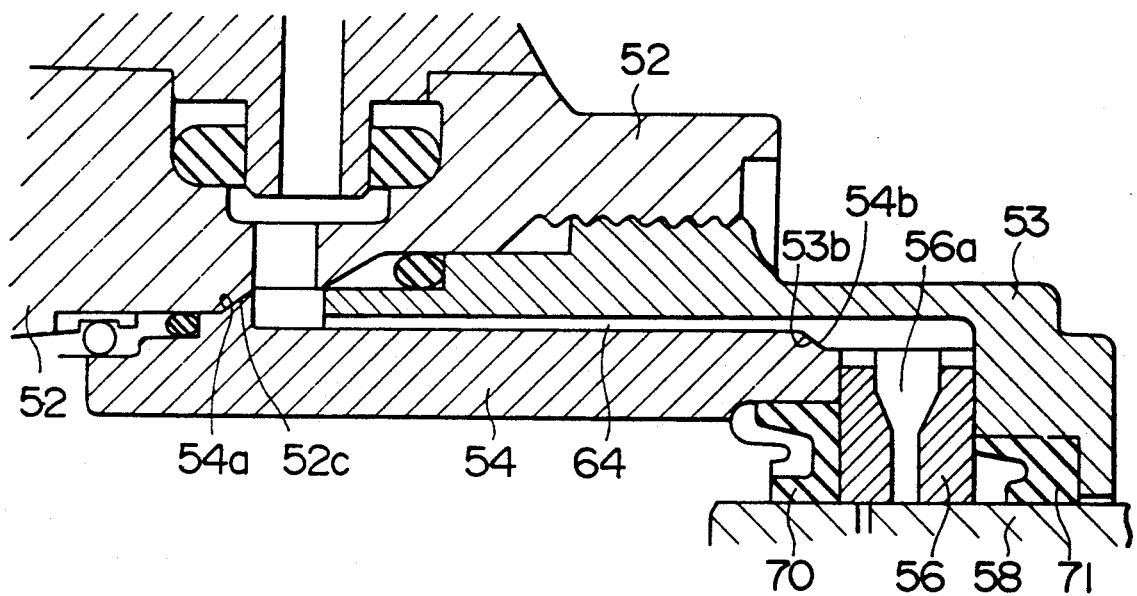

FIG. 5 and 6 show an alternative embodiment of the master cylinder in accordance with the present invention. In these figures, the cylinder housing 51 of the master cylinder 50 is constituted by a body 52 and a cap 53. The body 52 has an opening 52a on its one end, and an O ring is secured in place through this opening 52a to threadably receive the cap 53. Tapered portions 52c and 53b are defined in the inner peripheral surfaces 52b and 53a of the body 52 and the cap 53 respectively.

On the other hand, the sleeve 54 is molded from a resin, and has tapered portions 54a and 54b on its opposite ends.

Arranged in series in the cylinder housing 51 is a piston guide 55, a sleeve 54 and a piston guide 56. The piston guide 55 is centered in contact with the inner peripheral surface 52b of the body 52, whereas the sleeve 54 has its tapered portion 54b in abutment with the tapered portion 52c of the body 52 and the tapered portion 53b of the cap 53 in abutment with the tapered portion 54b. A secondary piston 57 is inserted through the piston guide 55 and the sleeve 54 so that the piston 57 may be guided by means of these piston guide 55 and the sleeve 54. A primary piston 58 is inserted through the sleeve 54 and the piston guide 56 so that the piston 58 may be guided by means of these sleeve 54 and the piston guide 56. The primary piston 58 is also inserted through the cap 53, having its one end extended far to the outside portion of the cylinder housing 51. Pistons 57 and 58 are urged in a right direction in FIG. 5 under the bias of springs 59 and 60 which are arranged between the body 52 and the piston 57 and between pistons 57 and 58.

Two pressure chambers 61 and 62 are defined in this cylinder housing 51 by means of the piston guide 55 and the secondary piston 57, and they are in communication with an oil reservoir 65 via small-diameter holes 57a and 58a, passages 55a and 56a defined in the peripheral walls of each of the piston guides, passages 63 and 64 defined in the cylinder housing 51 and passages 65a and 65b defined in the bottom of the oil reservoir 65, whereas they are communicated to wheel cylinders of front and rear wheels (not shown) in the braking system via ports 66 and 67 bored in the cylinder housing 51. In FIG. 5, numerals 68, 69, 70 and 71 represent annular sealing members.

The master cylinder 50 operates to move the primary piston 58 in a leftward direction in FIG. 5 under the depressing forces of the brake pedal (not shown), and thereby interrupting the communication between the passage 56a of the piston guide 56 and the passage 58a of the piston 58 and moreover it reduces the volume of the pressure chamber 62 to elevate the liquid pressure inside the pressure chamber 62 and convey such increased pressure to one of wheel cylinders (not shown) through the port 67. Furthermore, the movement of the primary piston 58 is transmitted to the secondary piston 57, whereby the piston 57 is moved in a leftward stroke and communication between the passage 55a of the piston guide 55 and the the passage 57a of the piston 57 is interrupted. In addition, the volume of the pressure chamber 61 is reduced and the liquid pressure inside the pressure chamber 61 is thereby elevated and the increased liquid pressure is conveyed to another wheel cylinder (not shown) through the port 66.

At this instant, the sleeve 54 receives a force which acts to deform the sleeve 54 in a radially outward direction under the liquid pressure of the pressure chamber 62, but such deformation of the sleeve 54 is prevented by an arrangement wherein tapered portions 52c and 53b of the body 52 and the cap 53 are brought into abutment with tapered portions 54a and 54b at opposite ends of the sleeve 54 respectively.

Thus, in the master cylinder 50, the sleeve 54 may not be easily deformed in a radially outward direction when its internal liquid pressure is elevated and at the same time substantially eliminating the occurance of a loss in the pressure increasing cycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A master cylinder comprising:
   a cylinder housing having a body with an opening defined at one end thereof, said cylinder housing further having a cap coupled with the body to close said opening;
   a piston inserted through said cap and freely slidable inside said cylinder housing, said cylinder housing and piston defining at least one pressure chamber;
   means for guiding the piston, said means for guiding comprising at least one piston guide and a sleeve, the means for guiding having a passage defined therein, said passage being in communication with an external fluid passage; and
   at least one groove having a micro-sized depth being defined in a surface of the at least one piston guide where the piston guide engages the cylinder housing, the groove extending from the external fluid passage to the pressure chamber and being located away from the end of the cylinder housing having the opening.

2. The master cylinder as recited in claim 1, wherein the piston comprises a primary piston and a secondary piston and a first pressure chamber is defined by the primary piston and the cylinder housing and a second pressure chamber is defined by the secondary piston and the cylinder housing, the first and second pressure chambers comprising the at least one pressure chamber, and the at least one groove extending between the external fluid passage and the second pressure chamber.

3. The master cylinder as recited in claim 1, wherein four grooves of micro-sized depth are provided in the surface of the piston guide.

4. The master cylinder as recited in claim 1, wherein the at least one groove ensures a flow passage for working fluid from the external fluid passage to the pressure chamber.

* * * * *